(12) United States Patent
Hirose

(10) Patent No.: US 6,809,049 B2
(45) Date of Patent: Oct. 26, 2004

(54) GLASS COMPOSITIONS AND GLASS FORMING MATERIALS COMPRISING SAID COMPOSITIONS

(75) Inventor: Jun Hirose, Nagoya (JP)

(73) Assignee: Noritake Co., Ltd., Nagoya (JP)

( * ) Notice: Subject to any disclaimer, the term of this patent is extended or adjusted under 35 U.S.C. 154(b) by 160 days.

(21) Appl. No.: 10/296,040
(22) PCT Filed: May 14, 2001
(86) PCT No.: PCT/JP01/04000
§ 371 (c)(1), (2), (4) Date: Nov. 21, 2002
(87) PCT Pub. No.: WO01/90012
PCT Pub. Date: Nov. 29, 2001

(65) Prior Publication Data
US 2003/0125185 A1 Jul. 3, 2003

(30) Foreign Application Priority Data
May 25, 2000 (JP) ........................ 2000-154092

(51) Int. Cl.$^7$ .............................. C03C 8/08; C03C 3/19
(52) U.S. Cl. ............................ 501/24; 501/17; 501/20; 501/21; 501/26; 501/45; 501/47; 428/426; 428/697; 428/701; 428/702
(58) Field of Search ........................ 501/14–18, 20–24, 501/26, 45, 47, 48; 428/49, 426, 432, 697, 701, 702

(56) References Cited
U.S. PATENT DOCUMENTS
4,224,627 A 9/1980 Powell et al.

FOREIGN PATENT DOCUMENTS

| | | |
|---|---|---|
| JP | A 51-128313 | 11/1976 |
| JP | A 51-130415 | 11/1976 |
| JP | A 51-146510 | 12/1976 |
| JP | A 62-207739 | 9/1987 |
| JP | A 8-183632 | 7/1996 |
| JP | A 9-188544 | 7/1997 |
| JP | A 11-335137 | 12/1999 |

Primary Examiner—Karl Group
Assistant Examiner—Elizabeth A. Bolden
(74) Attorney, Agent, or Firm—Oliff & Berridge, PLC

(57) ABSTRACT

The present invention provides glass compositions that can be used instead of known glass compositions containing a large amount of PbO in applications such as coating ceramic substrates, e.g., alumina, or sealing fluorescent tubes or the like. The invention also provides glass forming materials containing the glass compositions as a primary component for glass formation. Glass compositions provided by the present invention are comprises essentially of primary oxide components. The primary oxide components include ZnO, $B_2O_3$ and $P_2O_5$ as essential components and $Al_2O_3$, MgO, CaO and BaO as optional components. The amount of the primary oxide components is 85 wt % or more (preferably 90 wt % or more) of the total weight of the glass composition. Typically, the primary oxide components include 45 to 80% of ZnO, 5 to 45% of $B_2O_3$, 1 to 35% of $P_2O_5$, 0 to 10% of $Al_2O_3$, 0 to 15% of MgO, 0 to 10% of CaO, and 0 to 5% of BaO.

23 Claims, No Drawings

GLASS COMPOSITIONS AND GLASS FORMING MATERIALS COMPRISING SAID COMPOSITIONS

TECHNICAL FIELD

The present invention relates to glass compositions (hereinafter referred to "vitreous compositions"). More specifically, the present invention relates to glass compositions that can be used as coatings for alumina substrates or other inorganic materials, as sealants, as glaze (enamel) forming pastes and other glass forming materials containing the glass compositions as the primary component for glass formation.

BACKGROUND ART

Glass is used as a coating for ceramic substrates, such as alumina in which a circuit is formed on the surface, or as a sealant for fluorescent tubes and the like. Previously, glass compositions containing a large amount of lead oxide (hereinafter referred to as "high PbO glass compositions") or glass forming materials (typically, a paste-like glaze forming material) containing such compositions as the primary component were used as materials for forming glass in such applications. High PbO glass compositions have a low melting point, are easily formed into glass by glass forming processing, and have superior electrical insulation properties, thereby making high PbO glass compositions suitable for the above-described applications. For example, Japanese Laid-Open Patent Publication No. 62-207739 discloses a high PbO glass composition suitable for the above-described applications.

However, in recent years, so-called lead-free glass compositions characterized by containing substantially no lead oxide have been used instead of high PbO glass compositions, in view of increasing concerns about preventing environmental pollution and to improve workplace conditions. For example, Japanese Laid-Open Patent Publication Nos. 7-81972, 8-183632, 9-188544 and 10-236845 disclose several types of lead-free glass compositions intended for use in the above-described applications.

However, the known lead-free glass compositions disclosed in the above-noted publications do not have properties that are comparable to the known high PbO glass composition with respect to the applications of coating and sealing. For example, the known lead-free glass compositions generally have firing temperatures (typically about 900° C.) that are higher than the high PbO glass compositions. If the surface of an object (e.g., a ceramic circuit board) is glass-coated with a lead-free glass composition, it is necessary to fire the object at a relatively high temperature after the lead-free glass composition (typically a glaze forming material prepared in the form of paste) is applied to the object. Therefore, the high temperature during firing may adversely affect the properties of the object.

It is an object of the present invention to provide glass compositions that can be used in applications such as coating ceramic substrates, e.g., alumina, or sealing fluorescent tubes or the like under the same conditions that were used for the known high PbO glass compositions and without containing a large amount of lead (typically lead-free); glass forming materials containing such glass compositions as the primary component for glass formation are also provided.

SUMMARY OF THE INVENTION

Glass compositions provided by the present invention comprise primary oxide components in an amount of 85% (by weight, which applies to the following discussion) or more (preferably 90% or more) of the total weight of the composition; the primary oxide components include ZnO, $B_2O_3$ and $P_2O_5$ as essential components and the primary oxide components are provided in the amounts of 50 to 80% of ZnO, 5 to 35% of $B_2O_3$, 1 to 20% of $P_2O_5$, 0 to 10% of $Al_2O_3$, 0 to 15% of MgO, 0 to 10% of CaO, and 0 to 5% of BaO.

Additional glass compositions provided by the present invention include glass compositions that are substantially free of lead oxide and comprise primary oxide components in an amount of 90% or more (preferably 95% or more) of the total weight of the composition; the primary oxide components include ZnO, $B_2O_3$ and $P_2O_5$ as essential components and the primary oxide components are provided in the amounts of 45 to 80% of ZnO (preferably, 45 to 75% of ZnO), 5 to 45% of $B_2O_3$, 1 to 35% of $P_2O_5$, 0 to 10% of $Al_2O_3$, 0 to 15% of MgO, 0 to 10% of CaO, and 0 to 5% of BaO.

Glass compositions having these formulations (e.g., oxide glass compositions substantially comprising only vitreous oxide components) do not require excessive care to prevent environmental pollution, unlike the high PbO glass compositions. Furthermore, the firing temperature can be set to a temperature lower than known lead-free glass compositions (e.g., 650° C. or less). Therefore, it is possible to prevent property degradation of an object subjected to a glass coating process, such as a ceramic substrate, due to high firing temperatures. Preferably, the sum of the weight percentages of $Al_2O_3$, MgO, CaO and BaO in the glass compositions of the present invention is 15% or less (more preferably, 10% or less) of the total weight of the primary oxide components.

Additional preferred glass compositions of the present invention comprise primary oxide components in the amounts of 50 to 65% of ZnO, 10 to 30% of $B_2O_3$, and 10 to 30% of $P_2O_5$ (provided that the sum of the weight of $B_2O_3$ and $P_2O_5$ is 30 to 45% of the total weight of the composition); in addition, the glass compositions include 0 to 15% of one or two or more oxides selected from the group consisting of $Al_2O_3$, MgO, CaO, and BaO (provided that the weight percentage of BaO is 0 to 5% of the total weight of the primary oxide components). Such glass compositions can realize improved glass formation at comparatively low firing temperatures.

Another preferred glass composition of the present invention is an oxide glass composition that substantially comprises said primary oxide components in any of said weight proportions (the presence of a trace amount of impurities on the order of less than 1% is allowable).

Other preferred glass compositions of the present invention are substantially free of $SiO_2$ or only include $SiO_2$ in an amount of less than 1% of the total weight of the composition. Glass compositions that are free of $SiO_2$ or contain an extremely low amount of $SiO_2$ are preferable, because such glass compositions rarely devitrify during glass formation.

Other preferred glass compositions of the present invention are substantially free of alkali metal oxides and alkali metal ions (i.e., these substances are not present at all, or if present, the amount thereof is only in an unavoidable level as impurities or in a trace amount that does not affect glass formation, which also applies to the following discussion). Glass compositions having such a constitution enable prevention of beforehand damages to a circuit due to migration of alkali metal ions after a ceramic substrate circuit board has been subjected to glass coating. Therefore, circuit boards or the like that have been subjected to glass coating can be made more reliable and durable.

Furthermore, the present invention can provide glaze forming pastes or other glass forming materials containing the glass compositions of the present invention as a primary component for glass formation.

For example, glass forming materials comprising a glass composition as a glass forming component are provided; the glass composition comprises primary oxide components in an amount of 85% or more (preferable 90% or more) of the total weight of the composition; the primary oxide components include ZnO, $B_2O_3$ and $P_2O_5$ as essential components and the primary oxide components are provided in the amounts of 50 to 80% of ZnO, 5 to 35% of $B_2O_3$, 1 to 20% of $P_2O_5$, 0 to 10% of $Al_2O_3$, 0 to 15% of MgO, 0 to 10% of CaO, and 0 to 5% of BaO. In the alternative, glass forming materials comprising a glass composition as a glass forming component are provided, in which the glass composition is substantially free of lead oxide and comprises primary oxide components in an amount of 90% or more (preferably 95% or more) of the total weight of the composition; the primary oxide components include ZnO, $B_2O_3$ and $P_2O_5$ as essential components and the primary oxide components are provided in the amounts of 45 to 80% of ZnO (preferably 45 to 75% of ZnO), 5 to 45% of $B_2O_3$, 1 to 35% of $P_2O_5$, 0 to 10% of $Al_2O_3$, 0 to 15% of MgO, 0 to 10% of CaO, and 0 to 5% of BaO. These glass forming materials enable sealing and coating processes at firing temperatures that are lower than glass forming materials comprising the known lead-free glass composition as the primary component.

Preferred glass forming materials comprise the glass composition in the form of a powder and an appropriate vehicle and are prepared as a paste. Such paste-like materials are suitable for forming a glass layer (glaze) on the surface of various ceramic products (substrates, etc.).

BEST MODES FOR PRACTICING THE INVENTION

Hereinafter, preferred embodiments of glass compositions of the present invention will be described. The percent representation (%) in the following description refers to % by weight.

First, components of the glass composition of the present invention will be described. The above-mentioned primary oxide components include ZnO, $B_2O_3$ and $P_2O_5$ as essential components. In addition to these oxides, at least one oxide selected from $Al_2O_3$, MgO, CaO and BaO can be included as an optional component. Thus, the primary oxide components contained in the glass component of the present invention may consist of only the three essential components, ZnO, $B_2O_3$ and $P_2O_5$. In the alternative, the composition itself may be composed substantially of only these three oxides.

ZnO is a primary constituent of the glass compositions of the present invention and the largest constituent of the primary oxide components. The glass compositions of the present invention enable stable glass formation by appropriately mixing ZnO and the following oxides. However, if the amount of ZnO is more than 80% or less than 45% of the total primary oxide components, devitrification tends to occur during glass formation in a cooling process; thus, these amounts are not preferable. Preferably, the weight percentage of ZnO to the total composition is 45% to 75%, and particularly preferably is 50% to 65%.

$B_2O_3$ is an oxide that is directly involved in glass formation. If the amount of $B_2O_3$ is less than 5% of the total primary oxide components, stable glass formation cannot be achieved. On the other hand, if the amount of $B_2O_3$ is more than 45% of the total primary oxide components, the softening temperature may be increased. In addition, devitrification (crystal precipitation) tends to occur during glass formation in a cooling process; thus, these amounts are not preferable. This phenomenon can adversely affect sealing or glass coating. Preferably, the weight percentage of $B_2O_3$ to the total primary oxide components is 10% to 30%, and particularly preferably is 15% to 30%.

The oxides $P_2O_5$ and $B_2O_3$ are each directly involved in glass formation. $P_2O_5$ contributes to a reduction of the softening temperature. Addition of $P_2O_5$ can improve the smoothness of the glass surface. However, if the amount of $P_2O_5$ is more than 35% of the total primary oxide components, crystallization tends to occur during remelting; thus, the surface smoothness that is desired for sealing or coating applications may not be achieved. Preferably, the weight percentage of $P_2O_5$ to the total primary oxide components is 10% to 30%, and particularly preferably is 10% to 25%.

$Al_2O_3$, MgO, CaO and BaO are optional components that can be included in the glass compositions of the present invention together with the primary oxide components. If one or two or more of these oxides are mixed in appropriate amounts, crystallization may be suppressed, which crystallization can occur during remelting of the glass compositions. However, if the amount of either one of $Al_2O_3$ and CaO is more than 10% of the total primary oxide components, the amount of MgO is more than 15% of the total primary oxide components, or the amount of BaO is more than 5% of the total primary oxide components, then devitrification tends to occur during glass formation in a cooling process or a similar process; thus, these amounts are not preferable.

The sum of the weight percentages of $Al_2O_3$, MgO, CaO and BaO is preferably 15% or less of the total primary oxide components (provided that the percentage of BaO is not more than 5%).

$SiO_2$ is a common oxide for forming glass, but is an unnecessary constituent for formulating the glass compositions of the present invention. If the amount of $SiO_2$ is more than 1% of the total glass composition, devitrification tends to occur during glass formation in a cooling process. Moreover, the softening temperature may be too high; thus, this amount is not preferable. Therefore, the weight percentage of $SiO_2$ with respect to the total composition is preferably less than 1%, and it is particularly preferable that $SiO_2$ is substantially not present.

Glass compositions of the present invention are defined by including an appropriate combination of the primary oxide components at a suitable formulation ratio of the above-described oxides in an amount of 85% or more or 90% or more, preferably 95% or more, of the total composition. In the alternative, glass compositions of the present invention are defined by being composed exclusively of some of the above-described oxides with the exception of unavoidable impurities.

If glass compositions of the present invention are used as a coating material for glass-coating a ceramic material, a metal material or a composite of a ceramic and a metal such as a ceramic circuit board, as a sealing material for sealing these materials, or as a glaze (enamel), the primary oxide components having the following formulation ratio preferably are provided in amount of 85% or more (preferably 90% or more, more preferably 95% or more, and particularly preferably 100%) of the total composition. More specifically, the primary oxide components of the glass compositions of the present invention, which are particularly preferable for the above-described applications, include ZnO, which accounts for 50 to 65% of the total primary oxide components, $B_2O_3$ and $P_2O_5$, which account for 30 to 45% ($B_2O_3$ is in the range from 10 to 30% of the total primary oxide components, and $P_2O_5$ is in the range from 10 to 30% of the total primary oxide components), and at least one oxide selected from $Al_2O_3$, MgO, CaO and BaO, which accounts for 0 to 15% (BaO is selected such that the ratio is 0 to 5% of the total primary oxide components). According to the above formulation ratios, $Al_2O_3$, MgO, CaO and BaO are not essential components, and the content of these oxides can be 0%.

Glass compositions of the present invention are preferably comprise only the primary oxide components having the above-described formulations, but can include components other than the primary oxide components, as long as the additional components do not affect the desired glass formation properties. For example, other compounds (e.g., oxides other than the oxides constituting the primary oxide components) that are not constituents of the primary oxide components can be appropriately mixed.

The glass transition points (° C.) of the glass compositions of the present invention are generally in the range of 500° C. to 580° C. and typically in the range of 520° C. to 560° C. The yield (deformation) points (° C.) of the glass compositions of the present invention are generally in the range of 520° C. to 680° C. and typically in the range of 540° C. to 580° C. Thus, glass compositions of the present invention provide the low temperature melting properties, i.e., low melting points, which are preferable for sealing and coating (glaze formation). Therefore, the firing process can be performed at a lower firing temperature than the known high PbO glass compositions (e.g., compositions for forming borosilicate-lead glass). Typically, the firing process is performed for 10 to 20 min at a firing temperature of 700° C. or less (preferably 650° C. or less, typically 600 to 650° C.) in order to seal or coat a ceramic material or a metal material. Thus, it is possible to prevent degradation of the properties of the object that will be sealed or coated, which degradation would be caused by high temperatures during the firing process. In addition, the effects of migration can be avoided by using glass compositions of the present invention that are substantially free of alkali metal oxides and alkali metal ions. Thus, glass compositions of the present invention may be suitably used as glass forming materials for coating a surface (circuit) of a ceramic substrate.

Glass compositions of the present invention typically possess an average thermal expansion coefficient between room temperature and 300° C. within the range of $4.5 \times 10^{-6}$/° C. to $8.0 \times 10^{-6}$/° C., and preferably $5.0 \times 10^{-6}$/° C. to $7.5 \times 10^{-6}$/° C. The thermal expansion coefficient of the glass forming material can be adjusted by appropriately mixing in a low expansion material as a filler, which will be further described below. In addition to using the glass compositions of the present invention for coating, as was described above, the glass composition also may be used, e.g., for decorating various glass products or attaching (joining) ceramic materials, metal materials or these materials.

There are no restrictions concerning methods for producing the glass compositions of the present invention, and similar methods for producing known glass compositions can be used. Typically, compounds that provide the oxides constituting the above primary oxide components and other additives are mixed in appropriate amounts to prepare a starting material; the starting material is then heated and melted at a suitably high temperature (typically, 1000° C. to 1500° C.). Thereafter, the molten product is cooled (preferably rapid cooled) to form a glass. The resulting vitreous composition can be shaped into desired forms by various methods. For example, a powdered glass composition having a desired average particle size (e.g., 1 μm to 10 μm) can be obtained by grinding with a ball mill.

If the glass compositions of the present invention are used as a glass forming material, generally speaking, the glass composition is prepared in the form of a powder, and the powdered composition is mixed with water or an organic solvent to form a paste. For example, if the glass compositions of the present invention are used as a glass forming component of a paste-like glass forming material for glaze formation, the glass composition, which has been ground into a powder by milling or the like, is typically mixed with a vehicle containing water or an organic solvent in order to prepare the paste-like glass forming material. Furthermore, various additives (fillers) can be added, depending upon the application and purpose. If a paste-like glass forming material is prepared, e.g., for forming a glaze on a ceramic substrate, a suitable solvent containing a suitable high molecular weight component dissolved therein can be used as the vehicle, although the vehicle is not limited thereto. Examples of such suitable high molecular weight components include, but are not limited to, various celluloses (methyl cellulose, ethyl cellulose, cellulose nitrate, etc.), acrylic resin, and epoxy resin. Examples of suitable solvents include, but are not limited to, ester solvents, such as butyl carbitol acetate, ether solvents, such as butyl cellosolve and butyl carbitol, organic solvents, such as pine oil, various glycols and water. The ratio of the powdered materials (including the powdered glass composition and various additives) that is mixed with the vehicle can be a matter of choice for those skilled in the art and can be suitably determined in view of work efficiency. For example, 25 to 75 parts by weight of water or an organic solvent may be mixed with 100 parts by weight of the powdered material in order to prepare a paste.

An appropriate amount of the resulting glass forming material is applied or sprayed onto a ceramic, such as alumina, or a metal object that will be sealed or coated; then, a firing process is performed at a suitable temperature, thereby obtaining the desired sealed product or glass coated product.

Various additives (fillers) can be mixed with the glass compositions of the present invention during the preparation of the above-described paste-like glass forming material or other glass forming materials that can be provided by the present invention. Typical examples thereof include a variety of low expansion inorganic materials that can adjust the thermal expansion coefficient of the glass compositions of the present invention, which is the primary component. For example, alumina, cordierite, zircon, β-eucryptite, forsterite, spodumene, quartz glass, aluminum titanate, or the like can be used as low expansion inorganic materials. In particular, alumina is the most preferred for adjusting the thermal expansion coefficient among the above-listed low expansion inorganic materials. The low expansion inorganic material is mixed with the glass composition of the present invention such that the amount of the low expansion inorganic material is 20% or less (preferably 10% or less) of the total glass forming material. If a greater amount of filler is added, a relatively insufficient amount of the glass forming component is provided, which is not preferable. If, e.g., the glass forming component is insufficient, the airtightness of the sealed portion may be insufficient when the glass forming component is used for sealing.

Similar to the preparation of the paste, a typical method for preparing the glass forming material containing such a filler is to provide the filler as a powder; then, the powdered filler is mixed in a suitable ratio with the glass composition of the present invention, which has also been ground into a powder.

The present invention will be described in greater detail by way of the following examples. The present invention is not limited to these examples.

Glass compositions of the present invention having the compositions shown in Table 1 (Examples 1 to 9), a glass forming material containing a glass composition of the present invention (Example 10) and a known high PbO glass composition, which serves as a comparative example (Comparative Example 1), were prepared.

More specifically, in order to prepare compositions having the formulations (wt %) shown in Table 1, raw materials were suitably selected from $H_3BO_3$, $P_2O_5$, $Zn_3(PO_4)_2 \cdot 4H_2O$, ZnO, $Al_2O_3$, magnesium carbonate hydroxide, $CaCO_3$, $BaCO_3$, $SiO_2$, PbO, $Fe_2O_3$ or the like, were weighed such that a predetermined mixing ratio was obtained and were then mixed using a mixer. The resulting product was placed in a platinum pot and melted at a suitably high temperature (herein, 1200° C.) in an electrical furnace. Then, the molten product was removed from the furnace and was brought into contact with a low temperature element (herein, poured onto a stainless steel plate) for rapid cooling in order to form a glass having a predetermined shape (herein, plate-like). Then, the resulting plate-like glass was ground using a ball mill in order to prepare powdered glass compositions of the present invention and a powdered high PbO glass composition (Examples 1 to 9 and Comparative Example 1). Furthermore, in Example 10, powdered alumina was added and mixed with the prepared powdered glass composition in order to provide the formulation ratio shown in Table 1; thus, a glass forming material was obtained that substantially comprised the glass composition of the present invention and alumina (filler).

Then, the glass transition point, the yield point and the average thermal expansion coefficient were measured as indexes indicating the properties of the resulting glass compositions and glass forming materials.

More specifically, the powdered products of each example and the comparative example were compressed into predetermined forms and fired at 600° C. for 20 minutes, thereby producing rod-shaped samples having a length of 20 mm and a diameter of 4 mm. Then, the glass transition point (° C.), the yield point (° C.) and the average thermal expansion coefficient from room temperature to 400° C. or 500° C. were measured using a thermo-mechanical analyzer (TMA) or a differential thermal (expansion) analyzer. Table 1 shows the results.

TABLE 1

|  | Ex. | | | | | | | | | | Comp. Ex. | |
| --- | --- | --- | --- | --- | --- | --- | --- | --- | --- | --- | --- | --- |
|  | 1 | 2 | 3 | 4 | 5 | 6 | 7 | 8 | 9 | 10 | 1 | |
| Composition (wt %) | | | | | | | | | | | Composition (wt %) | |
| $B_2O_3$ | 18.1 | 27.3 | 17.0 | 16.2 | 17.4 | 15.7 | 16.3 | 17.3 | 13.2 | 16.5 | $SiO_2$ | 15.2 |
| $P_2O_5$ | 20.6 | 11.0 | 19.4 | 18.5 | 19.2 | 17.3 | 18.5 | 19.2 | 26.1 | 18.8 | $B_2O_3$ | 17.3 |
| ZnO | 61.2 | 61.6 | 58.3 | 55.8 | 58.4 | 53.3 | 56.0 | 58.7 | 60.7 | 55.7 | PbO | 54.4 |
| $Al_2O_3$ | 0.1 | 0.1 | 5.2 | 9.5 | | | | | | | $Al_2O_3$ | 2.5 |
| MgO | | | | | 5.0 | 13.7 | | | | | $Fe_2O_3$ | 0.5 |
| CaO | | 0.1 | | | | | 9.2 | | | | | |
| BaO | | | | | | | | 4.8 | | | | |
| $SiO_2$ | | | 0.1 | | | | | | | | | |
| Alumina (Filler) | | | | | | | | | | 9.0 | Alumina (Filler) | 10.0 |
| Glass Transition Point (° C.) | 520 | 538 | 533 | 542 | 535 | 550 | 521 | 530 | 560 | 528 | Glass Transition Point (° C.) | 470 |
| Yield Point (° C.) | 550 | 566 | 558 | 574 | 566 | 572 | 544 | 553 | 670 | 561 | Yield Point (° C.) | 500 |
| Thermal Expansion Coefficient (×10⁻⁶/° C.) | 6.2 | 5.9 | 6.1 | 5.4 | 7.1 | 7.4 | 7.1 | 6.2 | 5.2 | 6.5 | Thermal Expansion Coefficient (×10⁻⁶/° C.) | 8.5 |

As can be seen from the property data shown in Table 1, if the glass compositions and the glass forming materials of the examples are used, the sealing or coating process can be performed within a comparatively low temperature range of 700° C. or less (typically 650° C. or less), similar to known high PbO glass compositions. Furthermore, as can be seen from the results of the measured average thermal expansion coefficients, the glass compositions and the glass forming materials of the examples preferably can be used for coating a ceramic substrate made of alumina or the like.

Furthermore, a glaze forming paste was prepared using the powdered glass compositions of Examples 1 to 9. More specifically, 25 parts by weight of an organic solvent (butyl cellosolve acetate) containing an ethyl cellulose binder and 75 parts by weight of the powdered glass composition were mixed in order to prepare pastes containing each of the respective glass compositions of Examples 1 to 9 as the primary component. Then, these pastes were screen-printed on the surface of an alumina substrate and were fired at a temperature of 600 to 700° C., thereby forming a striped glaze (thickness of 20 $\mu$m) on the alumina substrate. In all the samples, the resulting glaze presented a smooth and glossy surface.

Although detailed examples of the present invention have been described, these examples are merely illustrative and can be practiced with a variety of changes and modifications that may be made using the knowledge of those skilled in the art.

As can be seen from the above-described examples, according to the glass compositions of the present invention, glass forming materials can be prepared that are functionally comparable to, and can replace, high PbO glass compositions. In other words, according to the glass compositions of the present invention and the glass forming materials (glaze forming pastes or the like) containing the composition as a vitreous component (glass forming component), glass coating processes for a ceramic substrate or the like or sealing processes can be performed at comparatively low firing temperatures, similar to known high PbO glass compositions.

What is claimed is:

1. A composition of matter, comprising;
    an inorganic material and
    a glass composition forming a coating on the inorganic material, the glass composition comprising:
    ZnO in an amount of 50–80% by weight,
    $B_2O_3$ in an amount of 5–35% by weight,
    $P_2O_5$ in an amount of 1–20% by weight,
    $Al_2O_3$ in an amount of 0–10% by weight,
    MgO in an amount of 0–15% by weight,
    CaO in an amount of 0–10% by weight, and
    BaO in an amount of 0–5% by weight,
    wherein said oxides comprise at least 85% of the total weight of the glass composition and the glass composition is substantially free of alkali metal oxides and alkali metal ions.

2. A composition of matter as in claim 1, wherein the glass composition comprises $SiO_2$ in an amount of less than 1% of the total weight of the glass composition.

3. A composition of matter as in claim 2, wherein the glass composition is substantially free of $SiO_2$.

4. A composition of matter as in claim 3, wherein the glass composition essentially consists of said oxides.

5. A composition of matter, comprising:
    an inorganic material and
    a glass composition forming a coating on the inorganic material, the glass composition comprising:
    ZnO in an amount of 45–80% by weight,
    $B_2O_3$ in an amount of 5–45% by weight,
    $P_2O_5$ in an amount of 1–35% by weight,
    $Al_2O_3$ in an amount of 0–10% by weight,
    MgO in an amount of 0–15% by weight,
    CaO in an amount of 0–10% by weight, and
    BaO in an amount of 0–5% by weight,
    wherein said oxides comprise at least 90% of the total weight of the glass composition and wherein the glass composition is substantially free of alkali metal oxides, alkali metal ions and lead oxides.

6. A composition of matter as in claim 5, wherein the glass composition comprises:
    ZnO in an amount of 50–65% by weight,
    $B_2O_3$ in an amount of 10–30% by weight,
    $P_2O_5$ in an amount of 10–30% by weight, wherein the sum of the weight percentages of $B_2O_3$ and $P_2O_5$ is 30–45% of the total weight of said oxides, and
    at least one oxide selected from the group consisting of $Al_2O_3$, MgO, CaO and BaO in an amount of 0 to 15% by weight, wherein the weight percentage of BaO is 0–5% of the total weight of said oxides.

7. A composition of matter as in claim 6, wherein the glass composition comprises $SiO_2$ in an amount of less than 1% of the total weight of the glass composition.

8. A composition of matter as in claim 7, wherein the glass composition is substantially free of $SiO_2$.

9. A composition of matter as in claim 8, wherein the glass composition essentially consists of said oxides.

10. A coating material, comprising:
    a glass composition in the form of a powder, the glass composition comprising:
    ZnO in an amount of 50–80% by weight,
    $B_2O_3$ in an amount of 5–35% by weight,
    $P_2O_5$ in an amount of 1–20% by weight,
    $Al_2O_3$ in an amount of 0–10% by weight,
    MgO in an amount of 0–15% by weight,
    CaO in an amount of 0–10% by weight, and
    BaO in an amount of 0–5% by weight,
    wherein said oxides comprise at least 85% of the total weight of the glass composition and the glass composition is substantially free of alkali metal oxides and alkali metal ions, and
    a vehicle, wherein the powderized glass composition is suspended in the vehicle and the coating material is in the form of a paste.

11. A coating material as in claim 10, wherein the glass composition essentially consists of said oxides.

12. A coating material, comprising:
    a glass composition in the form of a powder, the glass composition comprising:
    ZnO in an amount of 45–80% by weight,
    $B_2O_3$ in an amount of 5–45% by weight,
    $P_2O_5$ in an amount of 1–35% by weight,
    $Al_2O_3$ in an amount of 0–10% by weight,
    MgO in an amount of 0–15% by weight,
    CaO in an amount of 0–10% by weight, and
    BaO in an amount of 0–5% by weight,
    wherein said oxides comprise at least 90% of the total weight of the glass composition and wherein the glass composition is substantially free of alkali metal oxides, alkali metal ions and lead oxides, and
    a vehicle, wherein the powderized glass composition is suspended in the vehicle and the coating material is in the form of a paste.

13. A coating material as in claim 12, wherein the glass composition comprises:
    ZnO in an amount of 50–65% by weight,
    $B_2O_3$ in an amount of 10–30% by weight,
    $P_2O_5$ in an amount of 10–30% by weight, wherein the sum of the weight percentages of $B_2O_3$ and $P_2O_5$ is 30–45% of the total weight of said oxides, and
    at least one oxide selected from the group consisting of $Al_2O_3$, MgO, CaO, and BaO in an amount of 0 to 15% by weight, wherein the weight percentage of BaO is 0–5% of the total weight of said oxides.

14. A coating material as in claim 13, wherein the glass composition essentially consists oxides.

15. A method for forming a glass layer on a surface of an inorganic material, comprising:
    applying a coating material to the surface of the inorganic material, and
    firing the coating material and the inorganic material, thereby forming the glass layer, wherein the coating material comprises:
    a glass composition in the form of a powder, the glass composition comprising:

ZnO in an amount of 50–80% by weight,
B$_2$O$_3$ in an amount of 5–35% by weight,
P$_2$O$_5$ in an amount of 1–20% by weight,
Al$_2$O$_3$ in an amount of 0–10% by weight,
MgO in an amount of 0–15% by weight,
CaO in an amount of 0–10% by weight, and
BaO in an amount of 0–5% by weight,
wherein said oxides comprise at least 85% of the total weight of the glass composition and the glass composition is substantially free of alkali metal oxides and alkali metal ions, and a vehicle, wherein the powderized glass composition is suspended in the vehicle and the coating material is in the form of a paste.

16. A method as in claim 15, wherein the inorganic material is selected from a ceramic material, a metal material, a glass product or a composite of a ceramic and a metal.

17. A method as in claim 15, wherein the inorganic material is a ceramic material.

18. A method for forming a glass layer on a surface of an inorganic material, comprising:
applying a coating material to the surface of the inorganic material, and
firing the coating material and the inorganic material, thereby forming the glass layer,
wherein the coating material comprises:
a glass composition in the form of a powder, the glass composition comprising:
ZnO in an amount of 50–80% by weight,
B$_2$O$_3$ in an amount of 5–35% by weight,
P$_2$O$_5$ in an amount of 1–20% by weight,
Al$_2$O$_3$ in an amount of 0–10% by weight,
MgO in an amount of 0–15% by weight,
CaO in an amount of 0–10% by weight, and
BaO in an amount of 0–5% by weight,
wherein said oxides comprise at least 85% of the total weight of the glass composition and the glass composition is substantially free of alkali metal oxides and alkali metal ions, and
a vehicle, wherein the powderized glass composition is suspended in the vehicle and the coating material is in the form of a paste, and wherein the glass composition essentially consists of said oxides.

19. A method for forming a glass layer on a surface of an inorganic material, comprising:
applying a coating material to the surface of the inorganic material, and
firing the coating material and the inorganic material, thereby forming the glass layer,
wherein the coating material comprises:
a glass composition in the form of a powder, the glass composition comprising:
ZnO in an amount of 45–80% by weight,
B$_2$O$_3$ in an amount of 5–45% by weight,
P$_2$O$_5$ in an amount of 1–35% by weight,
Al$_2$O$_3$ in an amount of 0–10% by weight,
MgO in an amount of 0–15% by weight,
CaO in an amount of 0–10% by weight, and
BaO in an amount of 0–5% by weight,
wherein said oxides comprise at least 90% of the total weight of the glass composition and wherein the glass composition is substantially free of alkali metal oxides, alkali metal ions and lead oxides, and
a vehicle, wherein the powderized glass composition is suspended in the vehicle and the coating material is in the form of a paste.

20. A method for forming a glass layer on a surface of an inorganic material, comprising:
applying a coating material to the surface of the inorganic material, and
firing the coating material and the inorganic material, thereby forming the glass layer,
wherein the coating material comprises:
a glass composition in the form of a powder, the glass composition comprising:
ZnO in an amount of 45–80% by weight,
B$_2$O$_3$ in an amount of 5–45% by weight,
P$_2$O$_5$ in an amount of 1–35% by weight,
Al$_2$O$_3$ in an amount of 0–10% by weight,
MgO in an amount of 0–15% by weight,
CaO in an amount of 0–10% by weight, and
BaO in an amount of 0–5% by weight,
wherein said oxides comprise at least 90% of the total weight of the glass composition and wherein the glass composition is substantially free of alkali metal oxides, alkali metal ions and lead oxides, and
a vehicle, wherein the powderized glass composition is suspended in the vehicle and the coating material is in the form of a paste, wherein the glass composition further comprises:
ZnO in an amount of 50–65% by weight,
B$_2$O$_3$ in an amount of 10–30% by weight,
P$_2$O$_5$ in an amount of 10–30% by weight, wherein the sum of the weight percentages of B$_2$O$_3$ and P$_2$O$_5$ is 30–45% of the total weight of said oxides, and
at least one oxide selected from the group consisting of Al$_2$O$_3$, MgO, CaO, and BaO in an amount of 0 to 15% by weight,
wherein the weight percentage of BaO is 0–5% of the total weight of said oxides.

21. A method for forming a glass layer on a surface of an inorganic material, comprising:
applying a coating material to the surface of the inorganic material, and
firing the coating material and the inorganic material, thereby forming the glass layer, wherein the coating material comprises:
a glass composition in the form of a powder, the glass composition comprising:
ZnO in an amount of 45–80% by weight,
B$_2$O$_3$ in an amount of 5–45% by weight,
P$_2$O$_5$ in an amount of 1–35% by weight,
Al$_2$O$_3$ in an amount of 0–10% by weight,
MgO in an amount of 0–15% by weight,
CaO in an amount of 0–10% by weight, and
BaO in an amount of 0–5% by weight,
wherein said oxides comprise at least 90% of the total weight of the glass composition and wherein the glass composition is substantially free of alkali metal oxides, alkali metal ions and lead oxides, and a vehicle, wherein the powderized glass composition is suspended in the vehicle and the coating material is in the form of a paste, wherein the glass composition further comprises:

ZnO in an amount of 50–65% by weight, $B_2O_3$ in an amount of 10–30% by weight, $P_2O_5$ in an amount of 10–30% by weight, wherein the sum of the weight percentages of $B_2O_3$ and $P_2O_5$ is 30–45% of the total weight of said oxides, and at least one oxide selected from the group consisting of $Al_2O_3$, MgO, CaO, and BaO in an amount of 0 to 15% by weight, wherein the weight percentage of BaO is 0–5% of the total weight of said oxides, wherein the glass composition essentially consists of said oxides.

22. A method as in claim 21, wherein the inorganic material is selected from a ceramic material, a metal material, a glass product or a composite of a ceramic and a metal.

23. A method as in claim 21, wherein the inorganic material is a ceramic material.

* * * * *